(12) United States Patent
Jarema

(10) Patent No.: US 7,120,983 B2
(45) Date of Patent: Oct. 17, 2006

(54) METHOD OF USING PRECISION MACHINE MOVEMENT TOOL

(76) Inventor: Theodore Jarema, 3917 Carolynn Court, P.O. Box 202, Vineland, Ontario (CA) L0R 2C0

( * ) Notice: Subject to any disclaimer, the term of this patent is extended or adjusted under 35 U.S.C. 154(b) by 196 days.

(21) Appl. No.: 10/915,474

(22) Filed: Aug. 11, 2004

(65) Prior Publication Data

US 2005/0060865 A1    Mar. 24, 2005

Related U.S. Application Data

(60) Provisional application No. 60/502,211, filed on Sep. 12, 2003.

(51) Int. Cl.
*B23Q 3/00* (2006.01)
*B23Q 17/00* (2006.01)

(52) U.S. Cl. .......................................... 29/464; 29/406

(58) Field of Classification Search .................. 29/464, 29/468, 406, 407.09, 407.9; 269/295
See application file for complete search history.

(56) References Cited

U.S. PATENT DOCUMENTS 5,228,181 A * 7/1993 Ingle ........................... 29/272

* cited by examiner

*Primary Examiner*—John C. Hong
(74) *Attorney, Agent, or Firm*—Robert F. Delbridge

(57) ABSTRACT

A method of adjusting the position of a first object relative to a second object, the first object being releasably secured to the second object by a bolt. The method includes providing a precision movement tool comprising an L-shaped bracket having a base portion and a flange portion extending substantially perpendicularly from the base portion adjacent one end thereof, the base portion having an aperture adjacent an opposite end thereof, and a threaded adjustment bolt extending through a threaded aperture in the flange portion. The bolt is removed and the base portion of the precision movement tool is positioned so that the aperture in the base portion is aligned with apertures in the first and second objects from which the bolt has been removed. The precision movement tool is also positioned so that the flange portion overlies the first object such that the adjustment bolt can engage the first object. A bolt is passed through an aperture in the base portion and into the apertures in the first and second objects and secured in place in an untightened manner. The adjustment bolt is then rotated to engage the first object and move the first object relative to the second object by a desired amount.

3 Claims, 5 Drawing Sheets

METHOD OF USING PRECISION MACHINE MOVEMENT TOOL

RELATED APPLICATION

This application claims priority from U.S. Provisional Patent Application No. 60/502,211 filed Sep. 12, 2003.

FIELD OF INVENTION

This invention relates to precision machine movement tools.

BACKGROUND OF INVENTION

There are various situations where it is necessary to move a first object relative to another object in a precise manner. For example, it may be necessary to align a pump relative to a motor so that their driven and drive shafts respectively can be properly connected. Various precision movement tools have been previously proposed for this purpose, but such known tools are not particularly convenient to use.

It is therefore an object of the invention to provide a precision machine movement tool which is more convenient to use than known such tools.

SUMMARY OF INVENTION

The present invention provides a method of adjusting the position of a first object relative to a second object, the first object being secured to the second object by a bolt. The method includes providing a precision movement tool and a method of adjusting the position of a first object relative to a second object, the first object being releasably secured to the second object by a bolt, the method including providing a precision movement tool comprising an L-shaped bracket having a base portion and a flange portion extending substantially perpendicularly from the base portion adjacent one end thereof, the base portion having an aperture adjacent an opposite end thereof, and a threaded adjustment bolt extending through a threaded aperture in the flange portion, removing the bolt, positioning the base portion of the precision movement tool so that the aperture in the base portion is aligned with apertures in the first and second objects from which the bolt has been removed, also positioning the precision movement tool so that the flange portion overlies the first object such that the adjustment bolt can engage the first object, passing a bolt through an aperture in the base portion and into the apertures in the first and second objects, securing the bolt in place in an untightened manner, and rotating the adjustment bolt to engage the first object and move the first object relative to the second object by a desired amount.

The first object may be a first rotary machine with an input or output shaft, with the second object being a base therefore. Alternatively, the first object may be a first rotary machine with an input or output shaft, with the second object being a second rotary machine with an output or input shaft intended for connection to the input or output shaft of the first rotary machine.

The present invention also provides a precision movement tool comprising an L-shaped bracket having a base portion and a flange portion extending substantially perpendicularly downwardly from the base portion adjacent one end thereof, the base portion carrying an upstanding boss adjacent an opposite end thereof, the boss and the base portion having aligned apertures extending completely there through, and a threaded adjustment bolt extending through a threaded aperture in the flange portion.

BRIEF DESCRIPTION OF THE DRAWINGS

One embodiment of the invention will now be described, by way of example, with reference to the accompanying drawings, of which.

DESCRIPTION OF PREFERRED EMBODIMENTS

Figure 1:
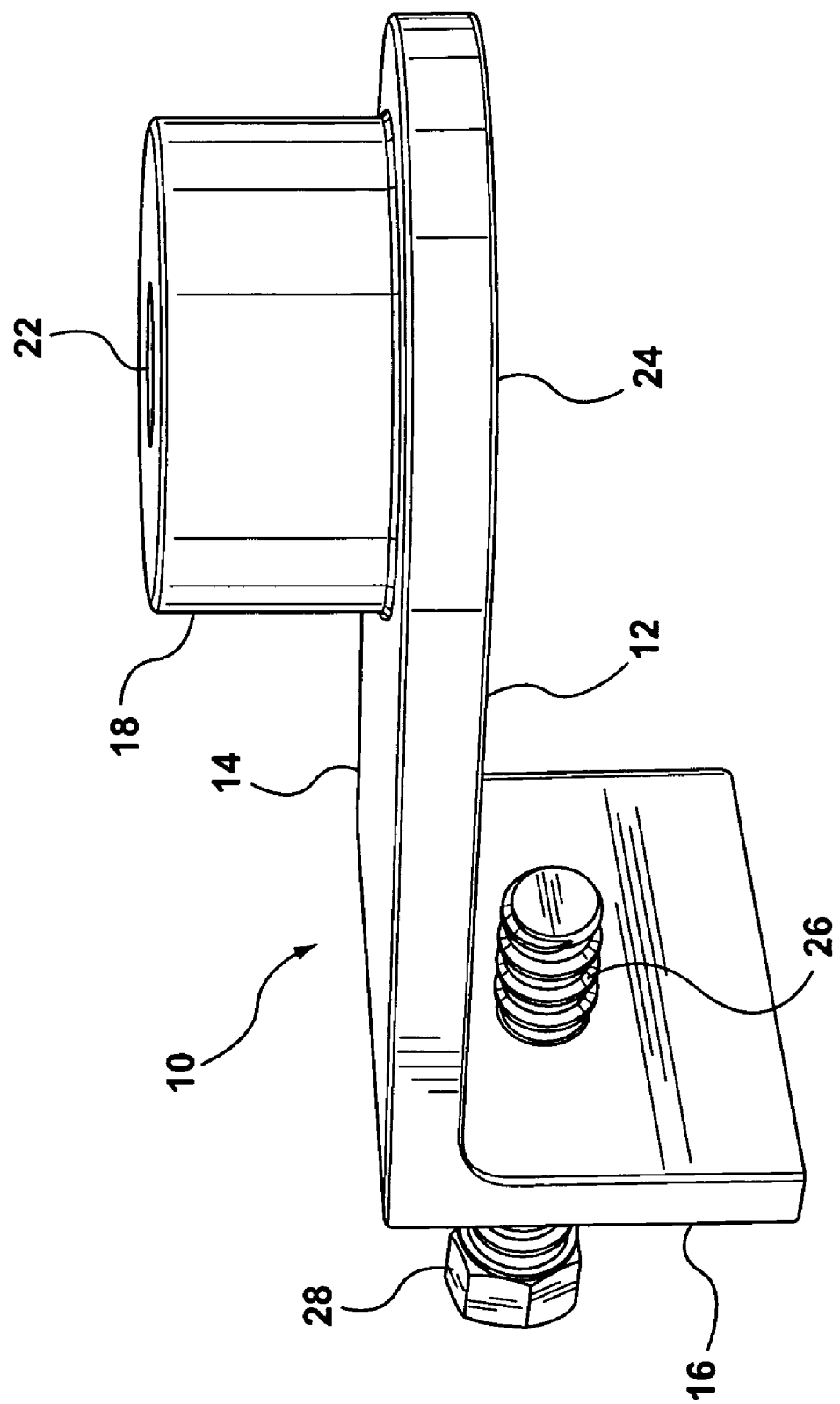
FIG. 1 is a perspective view of a precision machine movement tool in accordance with one embodiment of the invention.
Figure 2:
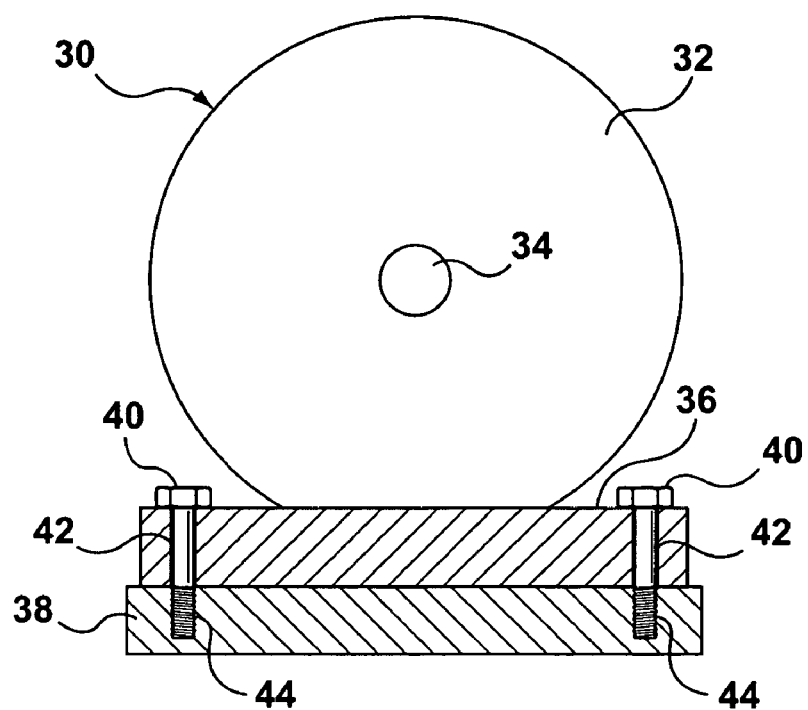
FIG. 2 is a diagrammatic side view of a motor mounted on a machine base and secured thereto by hold down bolts.
Figure 3:
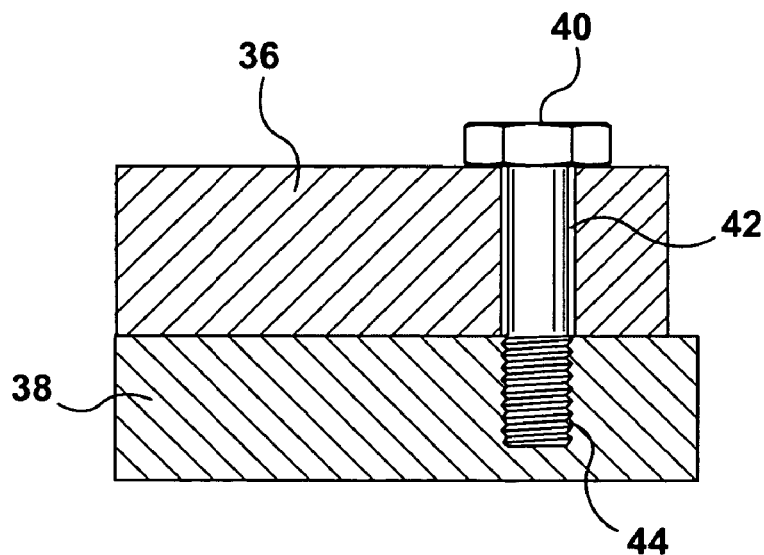
FIG. 3 is a side view on an enlarged scale of parts of the motor base and machine base of FIG. 1 secured by one of the hold down bolts.

Referring to the drawings, FIG. 1 shows a precision machine movement tool in accordance with one embodiment of the invention which comprises an L-shaped bracket 12 having a base portion 14 and a flange portion 16 extending perpendicularly to the base portion 14 at one end thereof. The base portion 14 carries an upstanding boss 18 adjacent to the opposite end, the boss 18 and the base portion 14 having aligned apertures 22, 24 respectively which extend continuously therethrough. An adjustment bolt 28 extends through a threaded aperture 26 in the flange portion 16.

FIGS. 2–5 show a use of the precision movement tool 10. A motor 30 has a housing 32 with a horizontal drive shaft 34, the housing 32 being mounted on a base 36. The motor base 36 is mounted on a machine base 38 and secured thereto by hold down bolts 40 which extend downwardly through apertures 42 in the motor base 36 into threaded bores 44 in the machine base 38. It is frequently necessary to align motor shaft 34 with a horizontal shaft of another component (not shown) such as a pump mounted on machine base 38. Determination of whether the motor shaft 34 and the other shaft are in the required alignment is made by conventional equipment (not shown). The present invention enables the motor 30 to be moved by small amounts to achieve the required alignment.

Figure 4:
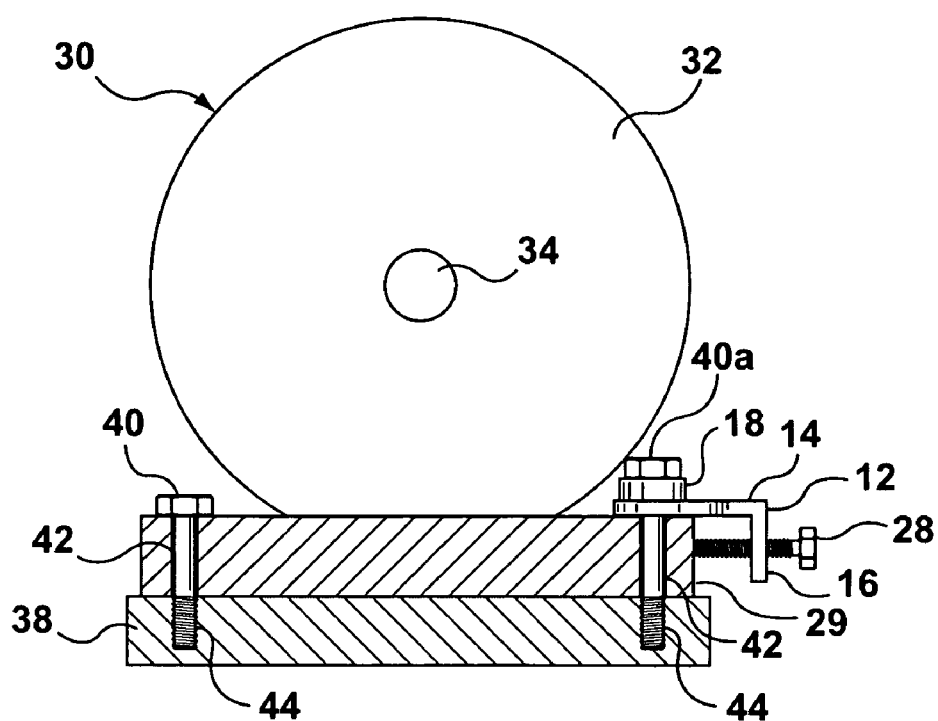
FIG. 4 is similar to FIG. 2, but with a precision movement tool in accordance with the invention secured thereto.
Figure 5:
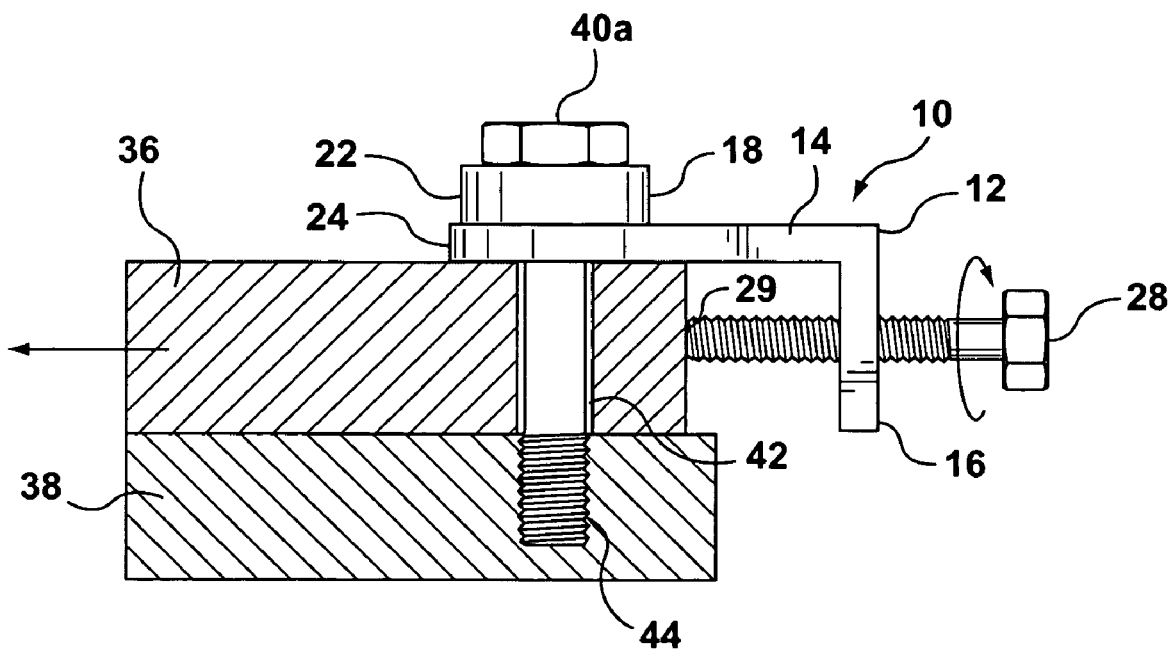
FIG. 5 is similar to FIG. 3, but showing the precision movement tool in position.

To move the motor 30 in an alignment adjusting manner, one of the hold down bolts 40 (the right hand bolt in FIGS. 2 and 3) is removed. The precision movement tool 10 is then mounted on the motor base 36, as shown in FIGS. 4 and 5, and a longer hold down bolt 40a is passed through apertures 22, 24 in the boss 18 and base portion 14 of the precision movement tool 10 and through the aperture 42 in the motor base 36 and into the threaded bore 44 in the machine base 38. The longer hold down bolt 40a is secured in place, but not tightened. The other hold down bolts 40 (the left hand bolt in FIGS. 4 and 5) are then loosened.

The adjustment bolt 28 of the precision movement tool 10 is then rotated to cause the end 29 of the adjustment bolt 28 to engage the motor base 36 and move it by the small required amount to effect the required alignment. The apertures 42 in the motor base 36 will of course have a diameter sufficient to enable such movement to take place.

When alignment is achieved, the longer hold down bolt 40a and the precision movement tool 10 are removed, the previously removed hold down bolt 40 is replaced and all the hold down bolts 40 are tightened.

Figure 7:
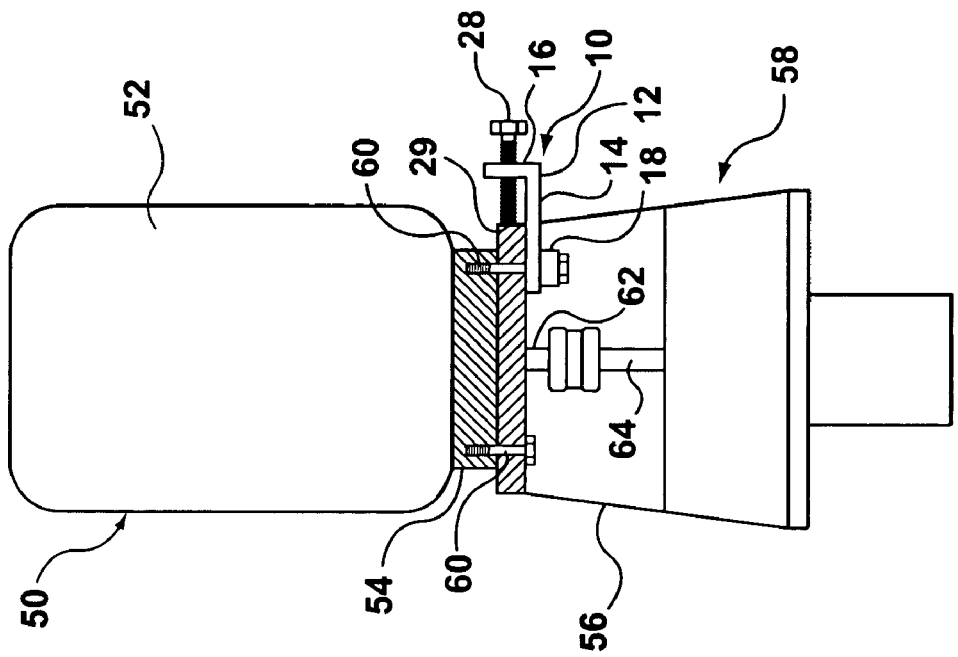
FIG. 7 is a similar view, but showing a precision movement tool in accordance with the invention secured in position.
Figure 6:
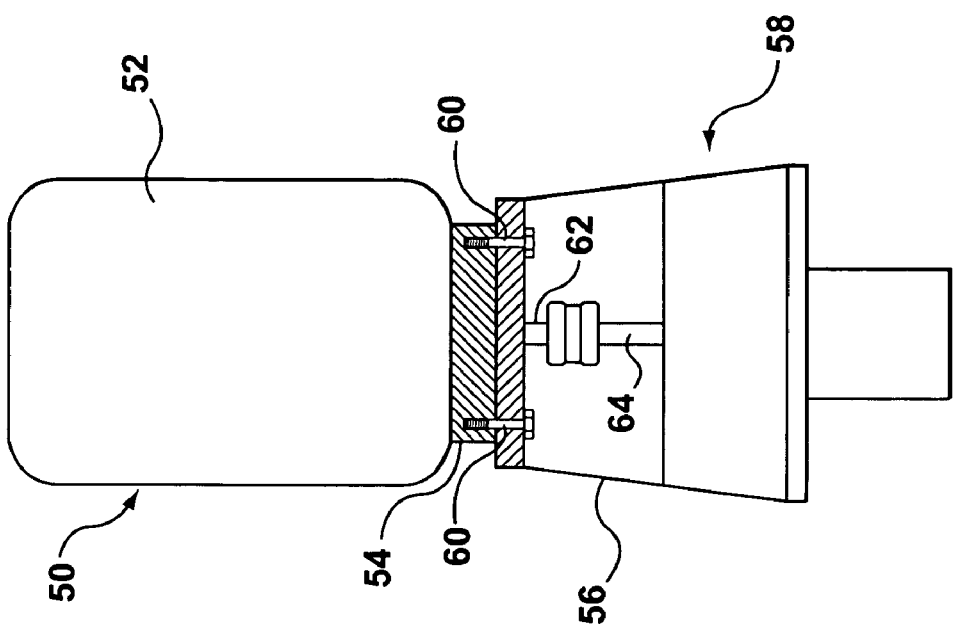
FIG. 6 is a diagrammatic side view of a motor secured to a pump by hold down bolts.
Figure 8:
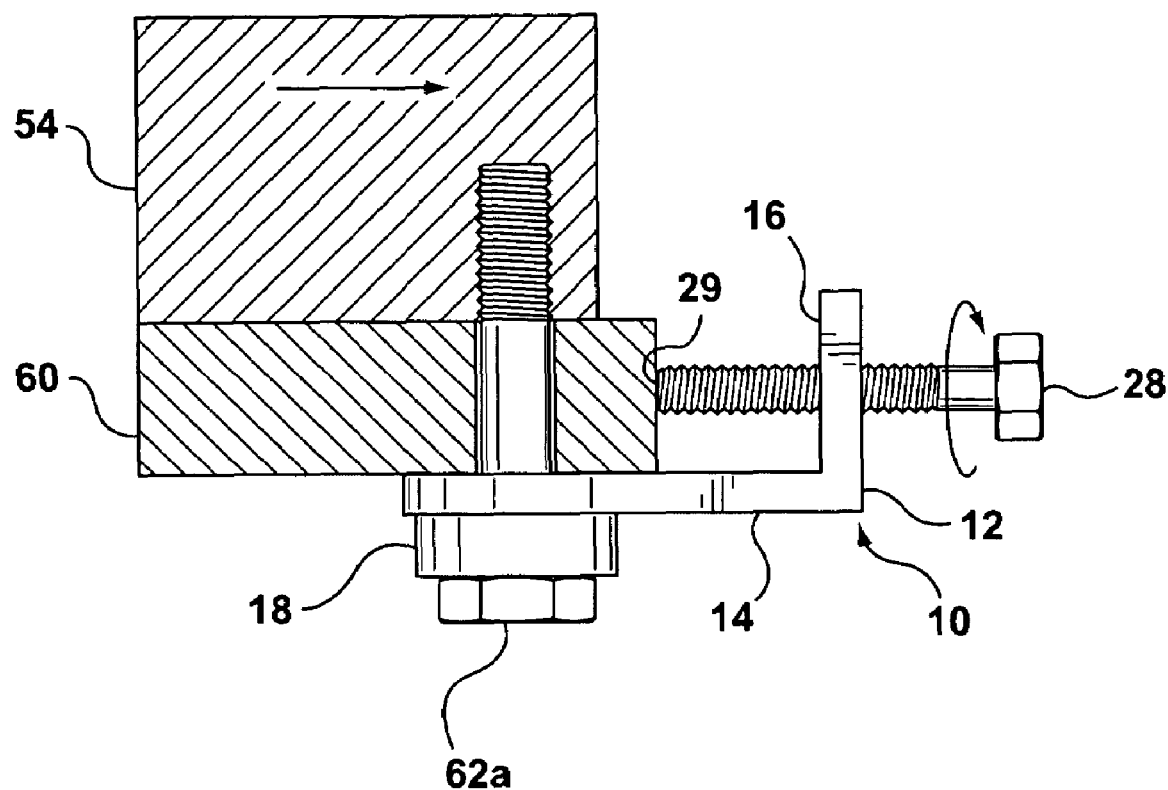
FIG. 8 is a similar view on an enlarged scale of parts of a motor base and pump housing with the precision movement tool in position.

FIGS. 4 and 5 described a use of the precision movement tool to effect alignment of two horizontal shafts. FIGS. 7 and 8 show a use of the precision movement tool 10 to align two vertical shafts. Referring to FIGS. 6 to 8, an electric motor 50 with a housing 52 has a base 54. The motor base 54 is mounted on top of the housing 56 of a pump 58 and secured thereto by hold down bolt 60. The motor 50 has a vertical drive shaft 62 which projects downwardly from the lower end of the motor 50 and passes into the pump housing 56 (through an aperture not shown) for connection with a driven shaft 64 which extends upwardly from the pump 58.

The use of the precision movement tool 10 to align the pump 58 relative to the motor 50, in conjunction with a longer hold down bolt 60a will be clearly evident to a person skilled in the art from FIGS. 7 and 8 and the corresponding description of FIGS. 4 and 5.

The advantages of the present invention will also now be clearly apparent to a person skilled in the art from the foregoing description of a preferred embodiment and two possible uses thereof. Other embodiments of the invention will also be relatively apparent to a person skilled in the art, the scope of the invention being defined in the appended claims.

The invention claimed is:

1. A method of adjusting the position of a first object relative to a second object by moving the first object horizontally relative to the second object, the first object being releasably secured to the second object by a vertical first bolt, the method including providing a precision movement tool comprising an L-shaped bracket having a base portion and a flange portion extending substantially perpendicularly from the base portion adjacent one end thereof, the base portion having an aperture adjacent an opposite end thereof, and a threaded adjustment bolt extending through a threaded aperture in the flange portion, removing the vertical first bolt, positioning the base portion of the precision movement tool so that the base portion is horizontal with the aperture in the base portion aligned with apertures in the first and second objects from which the bolt has been removed, also positioning the precision movement tool so that the flange portion is vertical and overlies the first object such that the adjustment bolt is horizontal and can engage the first object, passing a second bolt through the aperture in the base portion and into the apertures in the first and second objects, securing the second bolt in place in an untightened manner, and rotating the adjustment bolt to engage the first object horizontally and move the first object relative to the second object by a desired amount.

2. A method according to claim 1 wherein the first object is a first rotary machine with an input or output shaft and the second object is a base therefor.

3. A method according to claim 1 wherein the first object is a first rotary machine with an input or output shaft and the second object is a second rotary machine with an output or input shaft intended for connection to the input or output shaft of the first rotary machine.

* * * * *